United States Patent
Kular et al.

(10) Patent No.: US 7,545,117 B2
(45) Date of Patent: Jun. 9, 2009

(54) TWO STAGE ENERGY STORAGE DEVICE

(75) Inventors: Andrew C. Kular, Ottawa (CA); Zuohang Zhu, Ottawa (CA)

(73) Assignee: ECOSOL Solar Technologies, Ltd., Ottawa, Ontario (CA)

( * ) Notice: Subject to any disclaimer, the term of this patent is extended or adjusted under 35 U.S.C. 154(b) by 50 days.

(21) Appl. No.: 10/561,027

(22) PCT Filed: Jun. 17, 2004

(86) PCT No.: PCT/US2004/019271

§ 371 (c)(1),
(2), (4) Date: Dec. 16, 2005

(87) PCT Pub. No.: WO2004/114433

PCT Pub. Date: Dec. 29, 2004

(65) Prior Publication Data

US 2006/0133003 A1    Jun. 22, 2006

Related U.S. Application Data

(60) Provisional application No. 60/479,541, filed on Jun. 17, 2003.

(51) Int. Cl.
*H01M 10/44* (2006.01)
*H02J 7/00* (2006.01)

(52) U.S. Cl. ............ 320/103; 320/101; 320/118; 320/119

(58) Field of Classification Search ............ 320/101, 320/119, 166, 167, 103, 116, 118
See application file for complete search history.

(56) References Cited

U.S. PATENT DOCUMENTS

| | | | |
|---|---|---|---|
| 3,921,049 A | 11/1975 | Mellors et al. | |
| 5,105,776 A * | 4/1992 | Tsuchiya et al. | 123/192.1 |
| 5,635,816 A | 6/1997 | Welsh et al. | |
| 5,844,398 A * | 12/1998 | Kwan et al. | 320/123 |
| 5,994,789 A * | 11/1999 | Ochiai | 307/10.1 |
| 6,216,480 B1 * | 4/2001 | Camus et al. | 62/235.1 |
| 6,268,666 B1 | 7/2001 | Bhowmik | |
| 6,339,311 B1 | 1/2002 | Caldwell | |
| 6,367,259 B1 | 4/2002 | Timm | |
| 7,193,390 B2 * | 3/2007 | Nagai et al. | 320/116 |
| 2003/0099121 A1 * | 5/2003 | Yang | 363/125 |

FOREIGN PATENT DOCUMENTS

| | | |
|---|---|---|
| DE | 19926105 A1 | 12/2000 |
| WO | 0189058 A | 11/2001 |

OTHER PUBLICATIONS

Supplementary European Search Report Under Article 153(7) EPC, issued Oct. 15, 2008, pp. 1-3.

* cited by examiner

*Primary Examiner*—Akm E Ullah
*Assistant Examiner*—Johali A Torres Ruiz
(74) *Attorney, Agent, or Firm*—Fox Rothschild LLP

(57) ABSTRACT

An electronic device, which captures and accumulates varying levels of electrical energy in suitable short-term storage means until the energy is of such a level that it can be efficiently transferred to at least one long-term storage device means, such as electro-chemical batteries. The invention further permits simultaneous transfer to a variety of electro-chemical batteries, which can possess different storage chemistries.

20 Claims, 3 Drawing Sheets

TWO STAGE ENERGY STORAGE DEVICE

CROSS REFERENCE TO RELATED APPLICATIONS

This application claims the priority of PCT Application No. PCT/US2004/019271 filed on Jun. 17, 2004, and provisional U.S. application Ser. No. 60/479,541, filed on 17 Jun. 2003 and entitled "A Two Stage Energy Storage Device" by Andrew C. Kular, the contents and substance of both these applications are hereby incorporated in total by reference.

FIELD OF THE INVENTION

This invention relates to electronic power management and storage devices.

BACKGROUND OF THE INVENTION

Portable electronic and electrical devices (PEDs) require lightweight and compact power sources. While some very low power devices (e.g. calculators) can be powered directly from energy sources such as photovoltaic cells (PV), for many practical PEDs a higher capacity energy storage device such as an electro-chemical battery (battery) is required. Many PEDs employ rechargeable batteries as a means for storing energy during a recharging process and then release the stored energy while the PED is in use.

As is well known to those skilled in the art, electro-chemical batteries have specific requirements for safe and efficient charging. These specific requirements vary by the specific battery technology but in all cases, safe and efficient charging requires applying energy within specific voltage and current levels for specific periods of time. For this reason, the typical energy source employed for charging batteries is generally from stationary and much larger source of energy such as, for example, electric utility mains power or an automobile battery.

The need to have access to a large power source at a fixed stationary location is often not convenient since the very nature of a PED is that the PED is portable and often in use some distance away from a large stationary source of power to recharge the battery. As is also well known to those skilled in the art, there are many potential sources of energy that might be employed to recharge a battery. However, many of these alternatives to large fixed sources of energy are often of an intermittent nature and may be of too low a level of power to be transformed by conventional methods to suit the specific voltage and current levels needed to safely and efficiently charge a battery. Examples of such potential alternative sources of energy are photovoltaic cells, manually operated electro-magnetic mechanical generators, and even brief connections to electric power utility mains (whenever a user can briefly pause near such mains).

Various simple means to recharge an electro-chemical battery using intermittent and variable sources such as photovoltaic cells are well-known in the prior art. An example of such a system is found in U.S. Pat. No. 3,921,041 entitled "Charging Circuit for Battery-Operated Devices Powered by Solar Cells", issued to Geoffrey Mellors, et al. on Nov. 18, 1975. FIG. 1 depicts a circuit employed by Mellors in this patent.

In the system of FIG. 1, the battery 102 can only be effectively charged when there is sufficient light intensity such that the voltage output from the PV cell 106 exceeds the battery voltage plus the forward biased diode threshold of device 104. In this case, any energy generated by the PV that is below voltage and current threshold is wasted since it cannot charge the battery B1.

A further problem with the approach of FIG. 1 is that some modern battery technologies such as Li-Ion cannot be safety charged without charge management electronics to limit voltage and current levels into the battery B1. Such charge management electronics may have even more demanding voltage and current levels than charging the battery directly. For this reason it is not uncommon to employ charge management electronics between the PV cell and the battery. An example of such a system is illustrated in FIG. 2. In this figure a high efficiency electronic circuit, typically in the form of a DC to DC converter 204 and associated regulation and sensing circuitry (not shown), is used to convert the DC voltage from the array of PV cells 202 to a voltage more suitable than a direct connection between the PV cells and the battery as in FIG. 1.

While the approach in FIG. 2 is an improvement over that of FIG. 1, it still suffers from the inability to effectively make use of low levels or brief periods of illumination for two related reasons: 1) If the level of illumination is of a low level the voltage generated by the PV cell will not be sufficient to operate the DC to DC converter as any practical electronic device requires voltages well above zero to operate with an efficiency. And 2) If there are very high levels of illumination for a brief period, the PV cells might produce more energy than the batteries can safety absorb during the brief period of illumination. In this case the excess energy generated by the PV cells will be wasted since it cannot be captured and stored in the battery.

U.S. Pat. No. 3,921,049 entitled "Battery-Less Solar Power System" and issued to Miguel Timm on Apr. 9, 2002 recognizes the value of capturing variable and intermittent energy such as from a PV cell source and accumulates this energy in a capacitor. However, this invention employs the stored energy to operate a device directly. When this stored energy storage is sufficiently depleted, the device ceases operation. Consequently, its use is limited to specific applications where such interruptions are allowable.

There is a need in the prior art to provide the means for the efficient capture, accumulation and use of potential alternative sources of energy whose supply may be intermittent and variable in magnitude. Such alternative sources of energy include photovoltaic cells, manually operated electro-magnetic mechanical generators, wind power, and wave power. Further, there is a need to provide an effective means to use this captured energy to properly and efficiently recharge the battery power source(s) of an electrical device.

SUMMARY OF THE INVENTION

The present invention provides a system and method by which intermediate and variable sources of energy can be accumulated and used as an effective source of power for various electrical devices which are battery powered. According to the present invention, the variable and intermittent energy source is supplied to an intermediate or first stage of energy storage. This first stage of energy storage is then connected via a battery charge management component to a second stage storage device in the form of an electro-chemical battery.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
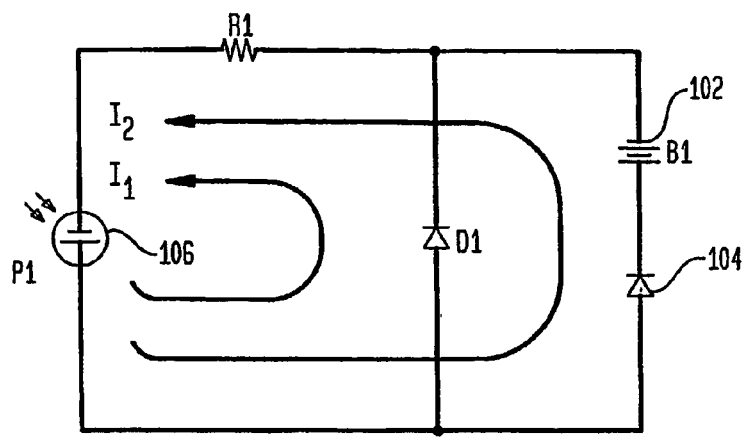
FIG. 1 illustrates a prior art system employing PV technology to recharge a battery.
Figure 2:
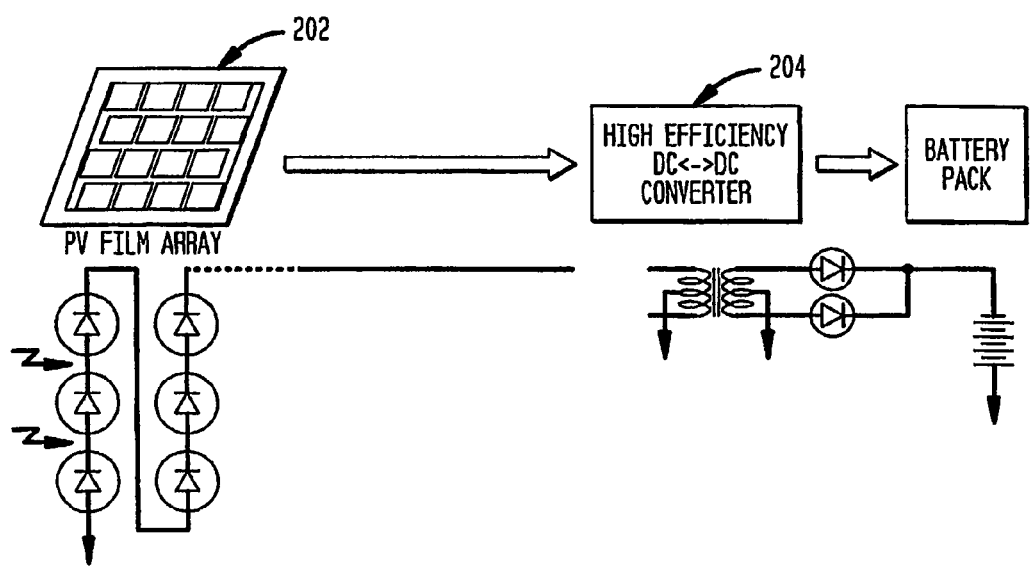
FIG. 2 illustrates a prior art PV charging system which uses charge management electronics.
Figure 3:
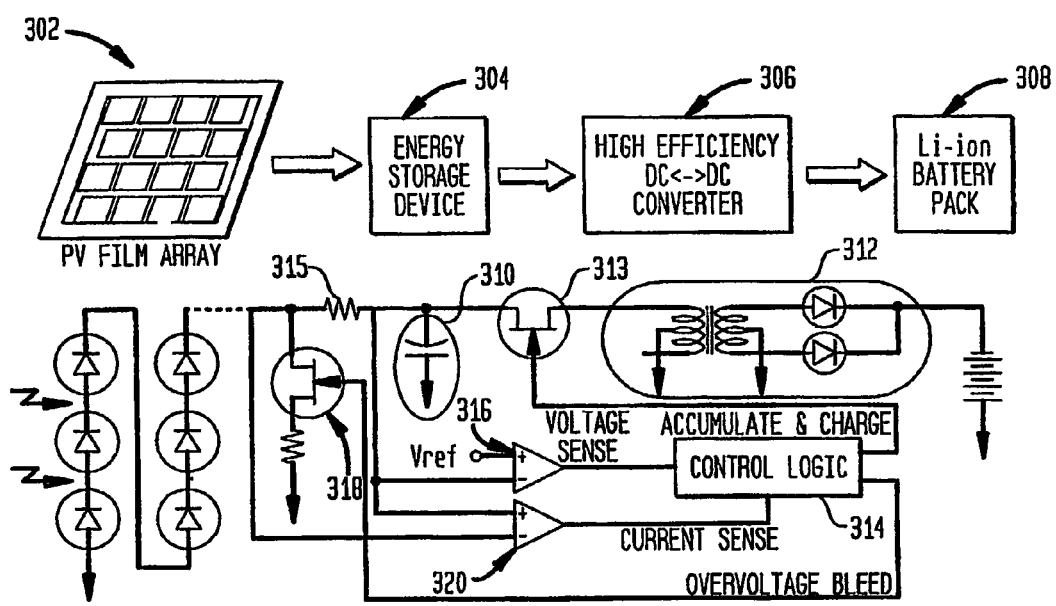
FIG. 3 is an overall block diagram of the present invention.

One embodiment of the invention is depicted in FIG. 3. In this figure, functional features are illustrated at the top of the figure while circuit components corresponding to those features are illustrated below. As illustrated, this embodiment comprises a PV array 302 as an example of a variable and intermittent energy source. Alternative embodiments of the invention permit the use of PV material in its primary state (i.e., without an array structure). The energy collected from this source is supplied to a first stage soft energy storage means 304, such as a high value capacitor 310—as might be realized by an electrical double layer capacitor (also known as an Ultra capacitor or a supercapacitor). The invention is not limited to such a double layer capacitor as additional embodiments of the invention utilize various electrical devices which exhibit capacitance or pseudo-capacitance behavior and which have a low Equivalent Series Resistance (ESR).

The first stage energy storage means is referred to herein as soft storage to distinguish it from the hard storage properties of a typical battery. The important properties of said first stage energy storage means are that it can accept and efficiently accumulate even low levels of energy from the energy source 302 without a threshold and without waste. The first stage energy storage means 304 is connected a switchable DC to DC converter 306 and 312. Suitable power regulation, transformation, and conditioning elements in the DC to DC converter accept the energy from the first stage of storage device and employ it to efficiently and safely charge a second stage storage device.

In addition to the DC to DC converter 312 illustrated in the circuit diagram of FIG. 3, a control logic component 314 is also depicted. The control logic component 314 monitors the voltage level on the first stage energy storage means 310 and when a voltage sensor 316 recognizes that the voltage exceeds a preset threshold; it activates a FET switch 313 and the DC to DC converter 312. In a further embodiment of the invention, the control logic also provides a means to protect the first stage energy storage means 310 from over-voltage conditions that might damage it. In particular, a switch 318 is employed to bleed excess energy and thereby limit the maximum voltage across the first stage energy storage means 310.

An additional feature of the control logic is a current flow sensor 320. The current flow sensor can determine if the energy source 302 is strong enough to source current into the energy storage means 310. Should the energy from the source cause the current flow to reverse thereby discharging the energy storage means 310, the current flow sensor 320 signals the control logic component 314 to transfer the energy from the storage means 310 even if the voltage is below the optimum threshold.

Also illustrated in FIG. 3 is a second stage energy storage device, a hard storage device 308 shown with a Li-Ion battery as an example. As used herein, a hard storage device is defined as the energy storage device employed for long term storage with a capacity of significantly more energy (higher density) than the first stage soft storage means 304.

It should be noted that while FIG. 3 depicts a single Li-Ion battery as the second storage device being charged by the invention, other types of batteries having various battery chemistries are contemplated by the invention. The control logic component 314 properly controls the voltage and current in the charging process of the particular second storage device. Further, the invention is not limited to only a single second storage device as multiple storage devices, each potentially having different charging requirements, are contemplated by the invention. Accordingly, the control logic component properly controls the voltage and current related to the charging requirements of each of these second storage devices.

The control logic component 314 will now be discussed in greater detail. In operation, and again referring to the embodiment depicted in FIG. 3, a current from the PV array 302 is detected by a current sensing resistor 315 and the resultant voltage signal is amplified in a linear fashion by the operational amplifier 320. The amplified signal produced is fed to an analog to digital converter within the control logic component 314. The control logic component permits setting of various threshold values, to include the operating parameters of the various soft or hard energy storage components contained in the system. This feature of the invention is implemented via programmable software code, a programmable logic chip (i.e. firmware), hardware pin connectors, and combinations thereof. Hard storage materials tend to be chemical based in nature and exhibit greater electrical energy storage density. Soft storage materials store electrons on the basis of available surface area and therefore exhibit low electrical energy storage density.

Based on the signal analysis, the control logic component 314 can determine both the magnitude and direction of electrical energy flows within the system. As a result it can effect the various functions noted above (e.g., detecting excess voltage or reverse current flow with respect to storage means 310). Further, the control logic component 310 can then apply this energy to operate any application requiring electrical energy which may be desired, for example, portable electronic devices (cellular telephones, hand-held computing devices, etc.).

Figure 4:
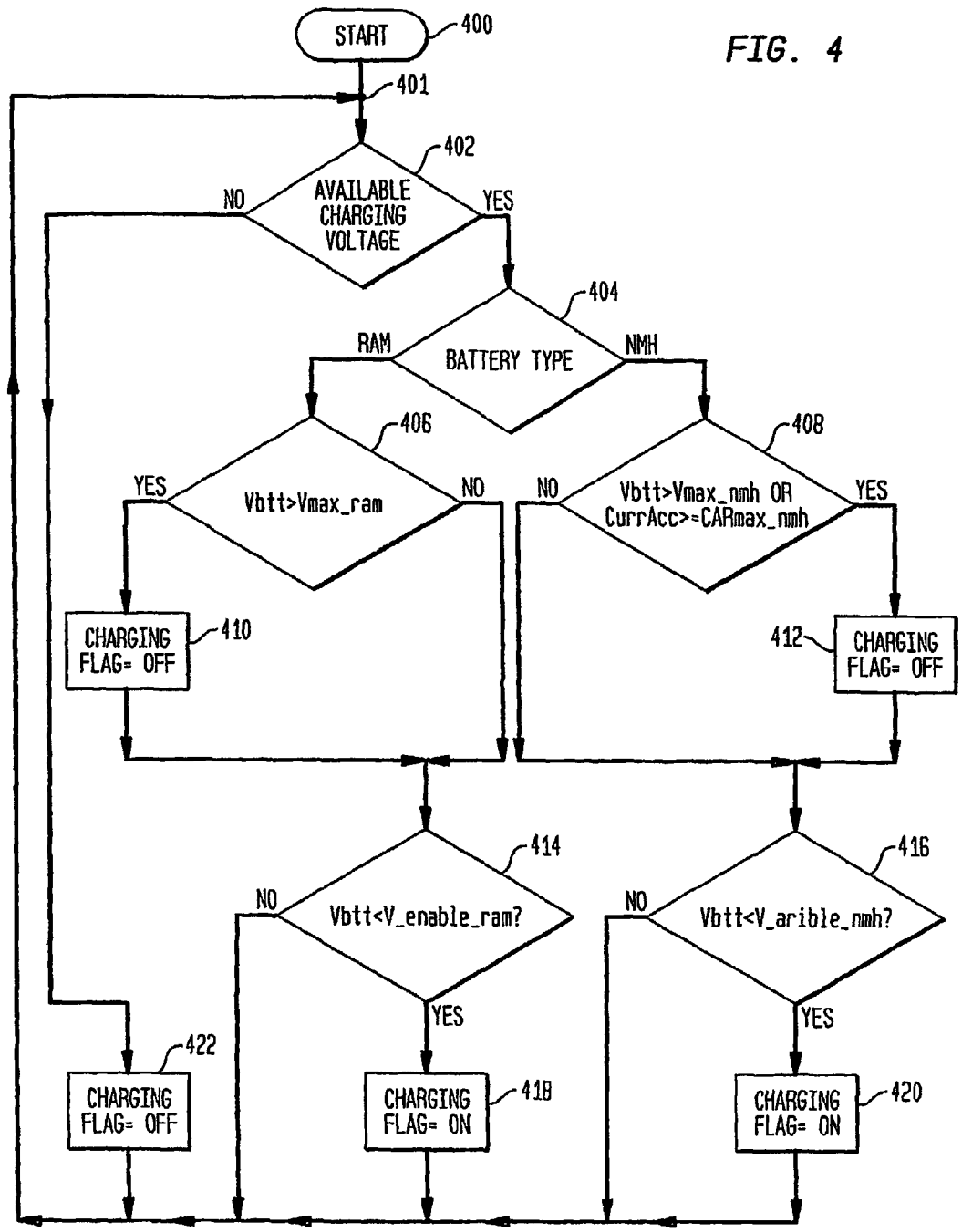
FIG. 4 is a flow diagram illustrating an example of the operation of control logic component of the embodiment of FIG. 3

As noted above, an important feature of the present invention is its ability to recharge one or more batteries, of differing battery chemistries. FIG. 4 illustrates this feature with respect to two battery types: a Rechargeable Alkaline Manganese (RAM) battery and a Nickel Metal Hydrate (NMh) battery. At the Start location (item 400) various initialization steps are performed to include setting the Charging Flag to an Off State. The charging flag is the indication to the system to commence/continue the charging operation of the batteries. The depicted algorithm is cyclically performed under the control of a timer. Each such cycle commences at point 401.

At the commencement of each cycle, a determination is made step (401) whether or not there is available charging current. Referring to FIG. 3, this would correspond to voltage sensor 316 recognizing that the first energy storage means has accumulated sufficient voltage. In the event such available voltage is lacking, the charging flag is set OFF (Step 422) and the system simply waits until the next cycle.

With available charging voltage present, the system then commences (step 404) to the appropriate charging decision branch for each available battery that has been assigned to be charged by the system. In this example two such batteries are present. Looking first at the RAM battery example, the system determines (at step 406) if the battery is at its maximum voltage (i.e., Vmax_ram). If it is, the charging flag is set to OFF. If it is not, charging may not commence as the system then looks (at step 414) to see if the battery voltage has been reduced to a threshold voltage value (i.e., V_enable_ram). By way of example, this threshold may be set to 90% of the maximum value and precludes unnecessarily charging a battery that does not require it. If the battery has not yet dropped to that level, the algorithm merely awaits the commencement of another cycle. If the battery does fall below the threshold, the charging flag is set to ON. Charging would then continue through successive cycles until the battery has attained its maximum voltage (step 406) or charging voltage is not longer available (step 402).

As depicted in FIG. 4, if a NMh battery is detected at step 404, its charging operation is conducted in the same manner, but with different threshold parameters being compared against (e.g, at steps 408 and 416). It should be noted that the algorithm illustrated in FIG. 4 permits simultaneous charging of both batteries.

The foregoing descriptions of the present invention have been presented for purposes of illustration and description. They are not intended to be exhaustive or to limit the invention to the precise forms disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed is:

1. An electronic device which captures and accumulates variable levels of electrical energy in a soft storage means until the accumulated energy is of such a level that it can be efficiently transferred to a hard storage means, said device comprising:
   a) a source of variable and intermittent electrical energy;
   b) a first stage energy storage means suitable for capturing and accumulating the electrical energy from the source, said first energy storage means having essentially no minimum threshold voltage for accumulating energy;
   c) a second stage energy storage means, which is capable of receiving said electrical energy from said first stage energy storage means and storing said electrical energy for later use; and,
   d) an electronic means which senses and monitors a voltage of the energy accumulated in the first stage storage means and then activating a charge management electronics means when said voltage of said first stage storage exceeds a variable but preset voltage thereby efficiently charging the second stage energy storage means, and wherein said preset voltage conforms to a minimum threshold for activation of said second stage energy storage means and said charge management electronics means further controls the charging current to conform to a variable but predetermined battery chemistry requirement of said second stage energy storage means.

2. The device of claim 1 wherein said first stage energy storage means comprises an electrical device which exhibits capacitance or pseudo-capacitance behavior and has a low Equivalent Series Resistance (ESR).

3. The device of claim 1 further comprising a control circuit that senses an over-voltage condition in the first stage energy storage means and limits the voltage to a safe level.

4. The device of claim 1 further comprising a control circuit that senses the direction of current "into" versus "out of" the first energy stage storage means and activates the transfer of any useful energy from the first stage storage means to the second stage storage means even if the voltage in the first stage storage means is not optimal for such a transfer.

5. The device of claim 1 wherein said energy source is selected from the group consisting of photovoltaic cells, manually operated electro-magnetic mechanical generators, wind power, wave power, electric power utility mains, AC transformers, DC transformers, and combinations thereof.

6. The device of claim 1 further comprising at least two first stage energy storage means.

7. The device of claim 1 further comprising at least two second stage energy storage means.

8. The device of claim 7 wherein said charge management electronics comprises a programmable means for setting parameters used to effect said efficient charging of the second stage storage means.

9. The device of claim 8 wherein said programmable means is selected from the group consisting of programmable software code, programmable logic chips, hardware pin connectors, and combinations thereof.

10. The device of claim 8 wherein said charge management electronic means permits independent charging of at least some of said at least two second stage storage means.

11. A method for capturing and accumulating variable levels of electrical energy in a first stage energy storage means until the accumulated energy is of such a level that it can be transferred to a second stage energy storage means, said method comprising:
   a) capturing and accumulating the energy into the first stage energy storage means, said first energy storage means having essentially no minimum threshold voltage for accumulating energy;
   b) sensing and monitoring a voltage of the energy accumulated in the first stage storage means; and,
   c) activating a charge management electronics means when the voltage of the first stage storage exceeds a variable but preset voltage, thereby efficiently charging the second stage energy storage means and wherein said preset voltage conforms to a minimum threshold for activation of said second stage energy storage means and said charge management electronics means further controls the charging current to conform to a variable but predetermined battery chemistry requirement of said second stage energy storage means.

12. The method of claim 11 wherein said first stage energy storage means comprises an electrical device which exhibits capacitance or pseudo-capacitance behavior and has a low Equivalent Series Resistance (ESR).

13. The method of claim 11 further comprising:
   sensing an over-voltage condition in the first stage energy storage means; and, limiting the voltage to a safe level.

14. The method of claim 11 further comprising:
   sensing the direction of current "into" versus "out of" the first energy stage storage means; and,
   activating the transfer of any useful energy from the first stage storage means to the second stage storage means even if the voltage in the first stage storage means is not optimal for such a transfer.

15. The method of claim 11 wherein said energy source is selected from the group consisting of photovoltaic cells, manually operated electro-magnetic mechanical generators, wind power, wave power, electric power utility mains, AC transformers, DC transformers, and combinations thereof.

16. The method of claim 11 further comprising at least two first stage energy storage means.

17. The method of claim 11 further comprising at least two second stage energy storage means.

18. The method of claim 17 further comprising utilizing a programmable means for setting parameters used to effect said efficient charging of the second stage storage means.

19. The method of claim 18 wherein said programmable means is selected from the group consisting of programmable software code, programmable logic chips, hardware pin connectors, and combinations thereof.

20. The method of claim 18 wherein said charge management electronic means permits independent charging of at least some of said at least two second stage storage means.

* * * * *